United States Patent

[11] 3,603,161

| [72] | Inventor | Karlhans Schwarz<br>Germany |
|---|---|---|
| [21] | Appl. No. | 855,145 |
| [22] | Filed | Sept. 4, 1969 |
| [45] | Patented | Sept. 7, 1971 |
| [73] | Assignee | Bodenseewerk Geratetechnik GmbH<br>Uberlingen, Bodensee, Germany |

[54] GYROSCOPE WITH COLLECTORLESS DC MOTOR
9 Claims, 6 Drawing Figs.

[52] U.S. Cl. ............................................. 74/5.6,
74/5.7, 318/254
[51] Int. Cl. ....................................... G01c 19/28
[50] Field of Search ............................ 74/5, 5.46,
5.6, 5.7; 318/254; 310/154, 156

[56] References Cited
UNITED STATES PATENTS

| 2,368,644 | 2/1945 | Curry, Jr. ................. | 74/5.46 |
| 2,959,060 | 11/1960 | Kunz .......................... | 74/5.6 |
| 3,157,053 | 11/1964 | Hall ........................... | 74/5.7 X |
| 3,281,629 | 10/1966 | Letilly et al. ............... | 318/254 X |
| 3,305,717 | 2/1967 | Weiss ......................... | 318/254 |
| 3,501,966 | 3/1970 | Schapiro et al. ........... | 74/5.6 |
| 3,504,252 | 3/1970 | Moczala et al. ............ | 318/254 X |

Primary Examiner—Manuel A. Antonakas
Attorney—Darbo, Robertson & Vandenburgh

ABSTRACT: The direct current gyromotor comprises a frame, a rotor rotatably mounted on the frame and a pair of relatively flat stator windings without cores. The rotor has a pair of spaced permanent magnets in cylindrical form and magnetized so that they each have pairs of north and south magnetic poles about their periphery. The two magnets are spaced from each other and positioned so that a north pole of one magnet is opposite a south pole of the other magnet. The stator coils are in the annular space between the magnets. The position of rotation of the rotor is detected by a phototransistor which reads a sequential series of light and dark areas on the rotor. The phototransistor is a part of a flip-flop which controls the conduction of four transistors in a bridge. The stator windings are connected across one diagonal of the bridge with the DC supply being connected across the other diagonal.

INVENTOR:
KARLHANS SCHWARZ
BY
Darbo, Robertson &
Vandenburgh

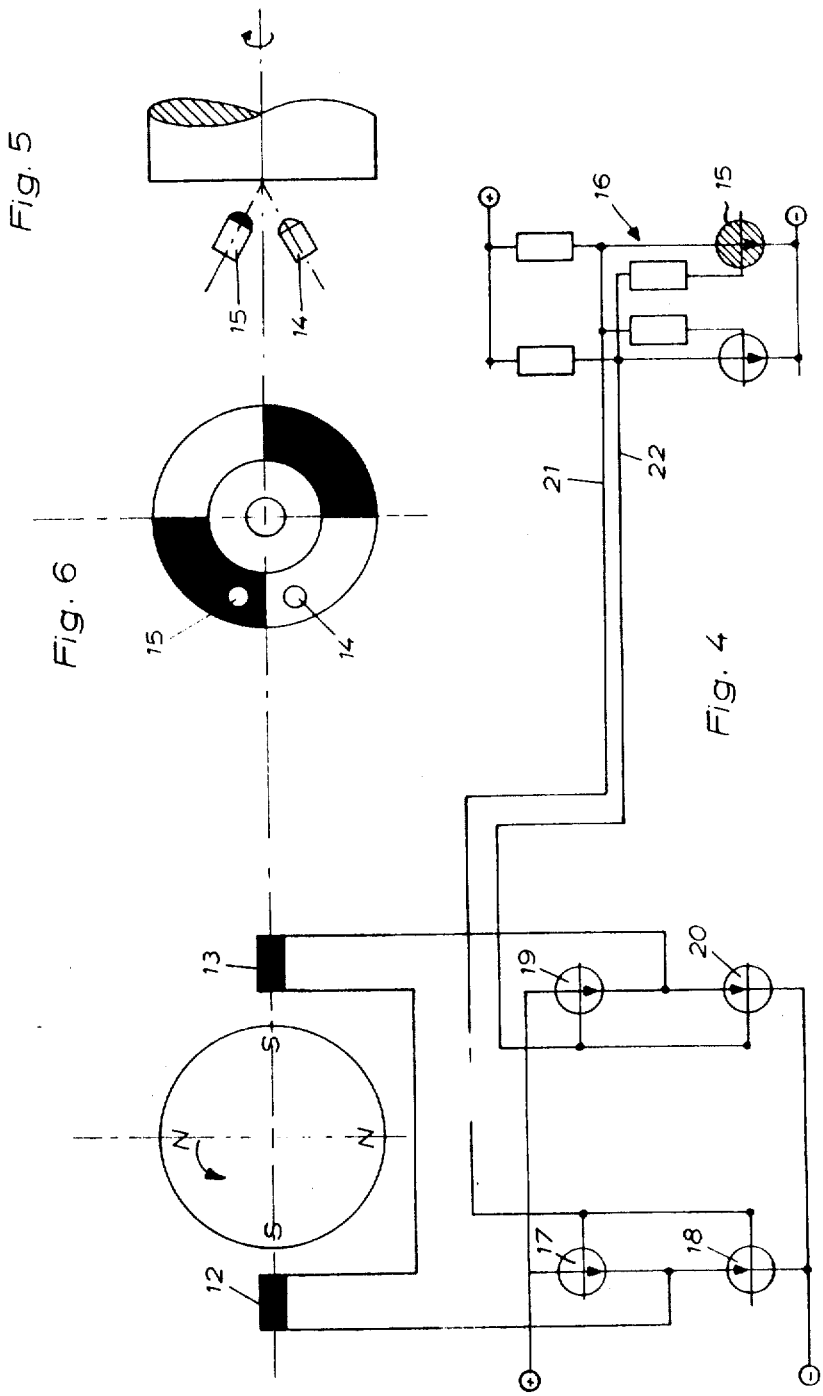

3,603,161

GYROSCOPE WITH COLLECTORLESS DC MOTOR

BACKGROUND AND SUMMARY OF THE INVENTION

The present invention relates to a gyro with collectorless DC motor.

It is of importance in the construction of gyros to make the moment of inertia of the gyro rotor about the spin axis as large as possible, while keeping the moment of inertia of the gyro about the precession axis vertical thereto as small as possible. This is because the latter moment of inertia detrimentally affects the dynamic properties of the gyro. Prior gyro constructions are unfavorable in this respect, since the iron short circuit in the stator leads to a large rest mass and therewith to a large moment of inertia about the precession axis.

It is an object of the present invention to provide a gyro having a favorable ratio of the rotor moment of inertia about the spin axis to the moment of inertia of the gyro about the precession axis.

The gyro according to the invention is characterized in that an ironless flat stator winding is positioned between two rotating ring permanent magnets of endwise lateral polarity (constituting the rotor) with a respective north magnetic pole of the one magnet facing a south magnetic pole of the other magnet, and vice versa. With this construction the moment of inertia of the stator about the precession axis is negligibly small. The magnetic field is established between the two rotating ring permanent magnets constituting the rotor. No iron short circuit is required in the stator. Thereby, an optimum ratio of the rotor moment of inertia about the spin axis to the moment of inertia of the whole gyro about the precession axis is obtained.

In prior collectorless DC motors the position of the armature is derived by Hall elements or by a high-frequency arrangement without the use of contacts, and is used in a control electronic system for the establishment of the rotary field. Both arrangements require a large electronic unit for their operation. The connection of the electronic unit to the motor necessitates flexible cables which apply a moment of error to the precession axis, thus causing a drift of the gyro.

The use of asymmetrical constructions necessarily involves a strong temperature drift which can frequently be compensated only with a considerable array of apparatus.

To avoid these disadvantages, in a further modification of the invention the rotor is provided with alternating bright and dark sectors which are sensed by a photoelectric sensing device, and commutation of the direct current is effected by means of a switching electronic arrangement controlled by the photoelectric sensing device. The photoelectric sensing for the control of the electronic commutation offers the advantage that not only a contactless sensing of the rotor is effected, but that no specific elements, with the exception of the alternating bright and dark coloring, need be provided on the rotor for the sensing, such as in the form of an armature for a high-frequency pickoff. Thereby a simple and a completely symmetrical arrangement of the gyro rotor is obtained. Also, the photoelectric sensing device contributes but little to a moment of inertia of the gyro assembly about the precession axis.

In a further modification of the invention, the electronic circuit elements are positioned on the supporting frame of the gyro. This eliminates the necessity for all flexible cables—with the exception of a bipolar voltage supply—which cables could apply a moment of error the precession axis. This is rendered possible, since, with the arrangement according to the invention, the electronic system for the electronic commutation becomes very simple and can be designed with few small components.

DESCRIPTION OF THE DRAWINGS

FIG. 4 is a schematic diagram of the collectorless electronic commutation of the gyromotor;

FIG. 5 is a side view of the photoelectric sensing device; and

FIG. 6 illustrates schematically the alternating dark and bright coloring of the rotor face for the photoelectric sensing.

DESCRIPTION OF THE SPECIFIC EMBODIMENT

Figure 1:
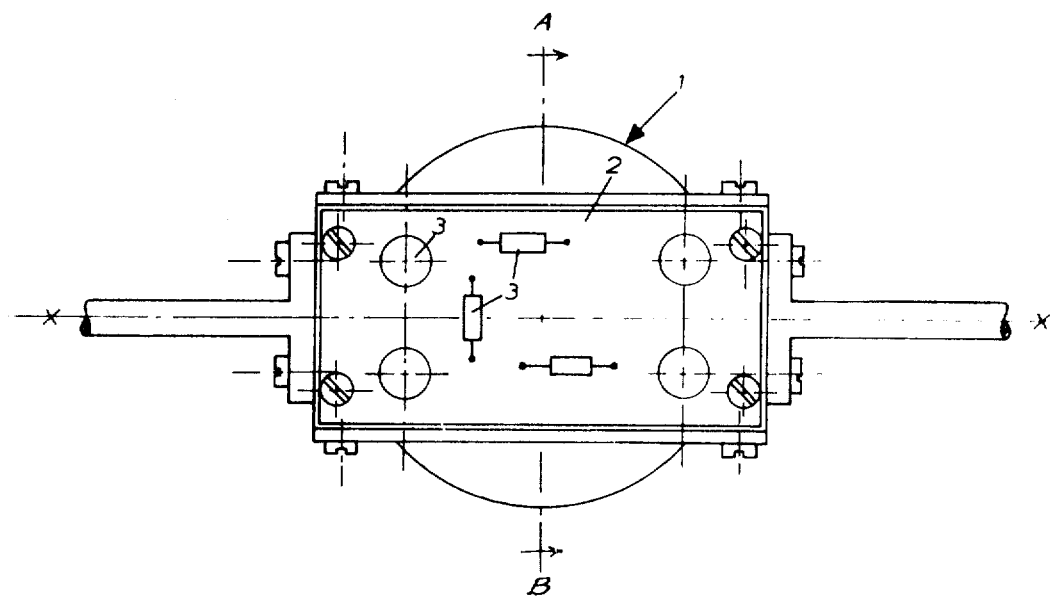
FIG. 1 is an end view of a gyro designed in accordance with the invention, as seen in a direction of the spin axis.

In FIG. 1 reference numeral 1 designates the housing or frame of the gyromotor. This housing is supported for rotation about the precession axis X—X. Plate 2 is a printed circuit board and carries the electronic components 3 for the collectorless commutation. Plate 2 is mounted on the housing 1.

Figure 2:
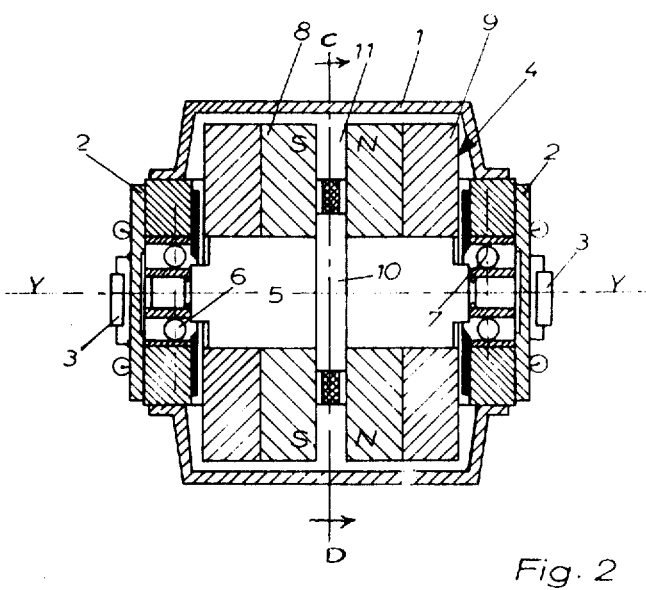
FIG. 2 is a longitudinal section of the gyro along the line A–B in FIG. 1.
Figure 3:
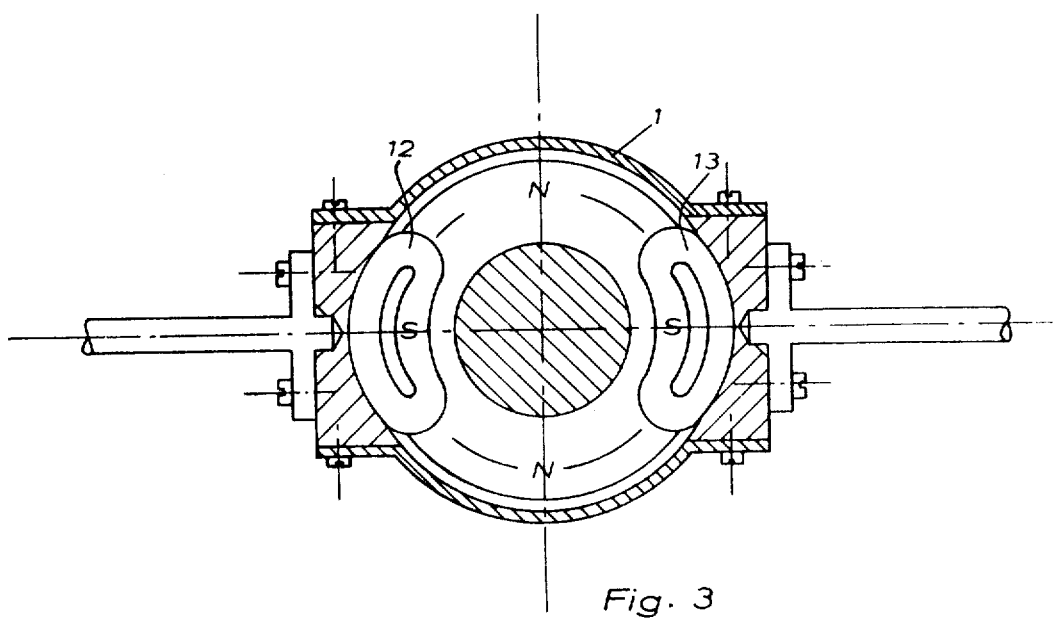
FIG. 3 is a section along the line C–D in FIG. 2.

As can be seen from the FIGS. 2 and 3, a rotor, generally 4, is supported in the housing 1 for rotation about a spin axis Y—Y normal to the precession axis. The rotor has a shaft 5 mounted in ball bearings 6, 7 in the housing 1. Two ring permanent magnets 8, 9 of endwise lateral polarity are mounted on the shaft 5. The magnets 8 and 9 are mounted on the shaft 5 in such a manner that a respective north magnetic pole of the one magnet faces a south magnetic pole of the other magnet, and vice versa. The magnets 8 and 9 are spaced apart by a collar 10 of the shaft, whereby an airgap 11 is provided between the magnets. In the airgap 11 the magnets produce a strong magnetic field. The stator comprises the ironless stator windings 12, 13 which are designed vary flat and are attached to the housing 1.

The flow of current through the stator windings 12, 13 is commutated without the use of collectors by a photoelectrically controlled circuit arrangement. As can be seen from FIG. 6, the face of the rotor is provided with alternating light and dark sectors. This coloring is sensed by a photoelectric-sensing device (FIGS. 5 and 6) formed by a light source 14, preferably a light diode, and a detector 15, preferably a phototransistor. As can be seen from FIG. 4, the phototransistor 15 constitutes one branch of a bistable flip-flop, generally 16. The flip-flop 16 will be in a first state, if the phototransistor 15 is illuminated via a bright surface of the rotor. It will be in a second state, if the phototransistor is not illuminated, which occurs when a dark surface of the rotor moves past the photoelectric-sensing device 14, 15.

The windings 12, 13 of the stator are connected in the diagonal of a DC bridge whose two branches are provided by pairs of complementary transistors 17, 18 and 19, 20 respectively. The two outputs 21 and 22 of the bistable flip-flop 16 each connect to the control elements of one pair of the transistors in an opposite sense. That is, with a relatively high voltage signal at outputs 21 and 22, one transistor of the pair to which the respective output is connected conducts and the other does not; while with a relatively low voltage signal the other conducts and said one does not. In a first state of the flip-flop, for example with a signal on output line 21, transistor 17 conducts, while the transistor 18 is blocked. Since the output 22 of the bistable flip-flop 16 is in a state complementary to the output 21, during the same interval the transistor 19 will be blocked and the transistor 20 will be conducting. Therefore, in this state, the outer end of the winding 12 connects to the positive pole of the direct-current source through the transistor 17, whereas the outer end of the winding 13 is connected to the negative pole of the direct-current source through the transistor 20. The current therefore flows from the positive pole of the direct-current therefore flows from the positive pole of the direct-current source through the transistor 17, the winding 12, the winding 13 and the transistor 20 to the negative pole of the direct-current source.

If the phototransistor 15 changes over into its other state and the bistable flip-flop 16 triggers accordingly, then the transistor 17 will be blocked through the output 21, and the transistor 18 conducts. Inversely, through the output 22 the transistor 19 commences conducting, while the transistor 20 will be blocked. In this state, current flows from the positive pole of the DC voltage source through the transistor 19, the windings 13 and 12 and the transistor 18 to the negative pole of the DC voltage source. Therefore, the direction of current flow through the windings 12, 13 is reversed. By using such a switching electronic system, the power loss of the commutator will be kept small in a manner known per se.

By suitable means known per se, the changeover frequency of the electronic commutator arrangement (FIG. 4) could be picked off and used for monitoring the gyrospeed.

Thus, by the invention a very simply designed gyro is provided operable with direct current. An extremely favorable ratio of the rotor moment of inertia about the spin axis to the moment of inertia of the gyro assembly about the precession axis is obtained. The collectorless commutation of the direct current is accomplished with extremely simple means. By the use of an electronic switching arrangement the power loss and therewith heating is kept small. By the arrangement of electronic components on the gyroframe, cables are avoided which otherwise would apply disturbing torques leading to a drift of the gyro. The gyro can be designed completely symmetrically, which is, for instance, of advantage with respect to the thermal expansion of the parts.

I claim:

1. In a gyro having an electric motor adapted to be connected to a source of direct current, the improvement wherein said motor comprises:
    a frame;
    a rotor mounted in said frame for rotation about an axis, said rotor comprising a pair of ring permanent magnets of endwise lateral polarity, said magnets being concentric with said axis and spaced a short distance from each other with a relatively narrow slot therebetween, said magnets being positioned so that a north magnetic pole of one magnet faces a south magnetic pole of the other magnet and vice versa;
    stator winding means attached to said frame and positioned in the slot between said magnets, said stator means being relatively flat in the direction parallel to said axis, said means comprising electrical windings without a high permeability core so that it weighs not substantially more than the windings; and
    commutating means connected to said stator winding means and having source supply connections adapted to be connected to said source to energize said windings to produce a reversing magnetic field across said stator winding means and between said permanent magnets.

2. In a gyro as set forth in claim 1, wherein said commutating means comprises:
    alternating light and dark areas on a portion of said rotor;
    electronic switching means connected to said stator winding means for changing the direction of flow of the direct current through said winding means; and
    a photoelectric-sensing device mounted on said frame and located at a position adjacent said portion of the rotor for determining whether a light or dark area of the rotor is adjacent said position, said device being connected to said switching means for causing the direct current flow to be in one direction through the winding means when a dark area is adjacent said position and causing the flow to be in opposite direction when a light area is adjacent said position.

3. In a gyro as set forth in claim 2, wherein, said electronic switching means comprises four transistors connected so that each transistor forms a leg of a direct current bridge having two pairs of opposite corners, said source supply connections being connected to one of said pair of corners, said stator winding means being connected to the other of said pair of corners, each of said transistors having a control element; and
    said sensing device comprises a bistable flip-flop having two branches, a phototransistor forming one of said branches, and means connecting said flip-flop to said control elements for establishing current flow from said source in one direction or the other through said bridge and stator winding means depending upon whether or not light is detected by said phototransistor, said phototransistor being located at said position to view said portion of said rotor.

4. In a gyro as set forth in claim 3, wherein said switching means is mounted on said frame.

5. In a gyro as set forth in claim 2, wherein said switching means is mounted on said frame.

6. In a gyro for connection to a source of direct current and comprising a direct current electric motor including a frame, a rotor and stator winding means mounted on the frame, and commutating means connected to said stator winding means, the improvement wherein said commutating means comprises:
    alternating light and dark areas on a portion of said rotor;
    electronic-switching means connected to said stator winding means and having connections adapted to be connected to said source for energizing said stator winding means and for changing the direction of flow of the direct current through said winding means; and
    a photoelectric-sensing device mounted on said frame and located at a position adjacent said portion of the rotor for determining whether a light or dark area of the rotor is adjacent said position, said device being connected to said switching means for causing the direct current flow to be in one direction through the winding means when a dark area is adjacent said position and causing the flow to be in opposite direction when a light area is adjacent said position.

7. In a gyro as set forth in claim 6, wherein,
    said electronic switching means comprises four transistors connected so that each transistor forms a leg of a direct current bridge having two pairs of opposite corners, said source supply connections being connected to one of said pair of corners, said stator winding means being connected to the other of said pair of corners, each of said transistors having a control element; and
    said sensing device comprises a bistable flip-flop having two branches, a phototransistor forming one of said branches, and means connecting said flip-flop to said control elements for establishing current flow from said source in one direction or the other through said bridge and stator winding means depending upon whether or not light is detected by said phototransistor, said phototransistor being located at said position to view said portion of said rotor.

8. In a gyro as set forth in claim 7, wherein said switching means is mounted on said frame.

9. In gyro as set forth in claim 6, wherein said switching means is mounted on said frame.